(12) United States Patent
Duclos et al.

(10) Patent No.: US 11,304,428 B2
(45) Date of Patent: Apr. 19, 2022

(54) INTERLOCKING KIBBLE

(71) Applicant: Mars, Incorporated, McLean, VA (US)

(72) Inventors: Laura Duclos, Franklin, TN (US); Kevin Eaton, Franklin, TN (US)

(73) Assignee: Mars, Incorporated, McLean, VA (US)

( * ) Notice: Subject to any disclaimer, the term of this patent is extended or adjusted under 35 U.S.C. 154(b) by 778 days.

(21) Appl. No.: 15/545,984

(22) PCT Filed: Feb. 16, 2016

(86) PCT No.: PCT/US2016/018085
§ 371 (c)(1),
(2) Date: Jul. 24, 2017

(87) PCT Pub. No.: WO2016/133909
PCT Pub. Date: Aug. 25, 2016

(65) Prior Publication Data
US 2018/0000120 A1 Jan. 4, 2018

Related U.S. Application Data

(60) Provisional application No. 62/116,906, filed on Feb. 16, 2015.

(51) Int. Cl.
*A23K 10/30* (2016.01)
*A23K 50/42* (2016.01)
*A23K 40/30* (2016.01)

(52) U.S. Cl.
CPC .............. *A23K 10/30* (2016.05); *A23K 40/30* (2016.05); *A23K 50/42* (2016.05)

(58) Field of Classification Search
CPC ......... A23K 10/30; A23K 40/30; A23K 50/42
USPC ....................................................... 426/635
See application file for complete search history.

(56) References Cited

U.S. PATENT DOCUMENTS

| | | |
|---|---|---|
| 3,168,796 A | 2/1965 | Scott |
| 3,338,723 A | 8/1967 | Lundquist |
| 3,467,525 A | 9/1969 | Hale et al. |
| 3,679,429 A | 7/1972 | Mohrman et al. |
| 3,753,741 A | 8/1973 | Stewart |
| 3,808,340 A | 4/1974 | Palmer |
| 3,883,672 A | 5/1975 | Bone et al. |
| 3,908,025 A | 9/1975 | Miller et al. |
| 3,959,511 A | 5/1976 | Balaz et al. |
| 4,011,346 A | 3/1977 | Ernst |
| 4,029,823 A | 6/1977 | Bone et al. |
| 4,039,168 A | 8/1977 | Caris et al. |
| 4,039,689 A | 8/1977 | Bone |
| 4,055,618 A | 10/1977 | Fujita et al. |
| 4,055,681 A | 10/1977 | Balaz et al. |
| 4,070,490 A | 1/1978 | Lugay et al. |
| 4,104,406 A | 8/1978 | Stringer et al. |
| 4,104,407 A | 8/1978 | Stringer et al. |
| 4,190,679 A | 2/1980 | Coffee et al. |
| 4,229,485 A | 10/1980 | Brown et al. |
| 4,284,652 A | 8/1981 | Christensen |
| 4,418,086 A | 11/1983 | Marino et al. |
| 4,419,372 A | 12/1983 | Greene et al. |
| 4,454,163 A | 6/1984 | Gellman et al. |
| 4,454,164 A | 6/1984 | Gellman et al. |
| 4,534,989 A | 8/1985 | Gellman et al. |
| 4,534,990 A | 8/1985 | Gellman et al. |
| 4,743,458 A | 5/1988 | Gellman et al. |
| 4,743,460 A | 5/1988 | Gellman et al. |
| 4,784,860 A | 11/1988 | Christensen et al. |
| 4,791,002 A | 12/1988 | Baker et al. |
| 4,804,549 A | 2/1989 | Howley et al. |
| 4,870,059 A | 9/1989 | Mitsuhashi et al. |
| 4,873,096 A | 10/1989 | Spiel et al. |
| 4,904,494 A | 2/1990 | Spanier |
| 4,904,495 A | 2/1990 | Spanier |
| 4,927,763 A | 5/1990 | Sudoma et al. |
| 4,956,295 A | 9/1990 | Sudoma |
| 5,000,940 A | 3/1991 | Staples et al. |
| 5,045,339 A | 9/1991 | Ducharme |
| 5,085,874 A | 2/1992 | Jungvid |
| 5,101,702 A | 4/1992 | Kuchler |
| 5,147,668 A | 9/1992 | Munk |
| 5,186,964 A | 2/1993 | Gierhart et al. |
| 5,283,059 A | 2/1994 | Suzuki et al. |
| 5,405,836 A | 4/1995 | Richar et al. |

(Continued)

FOREIGN PATENT DOCUMENTS

| | | |
|---|---|---|
| CN | 1927019 A | 3/2007 |
| CN | 101095470 A | 1/2008 |

(Continued)

OTHER PUBLICATIONS

Jiangsu, CN20372837.*
"All Bran Yogurt Bites Cereal", Product Picture downloaded from www.amazon.com, accessed Mar. 11, 2014, 1 pg.
"EVO Wild Cravings Red Meat Formula Dog Treats", available at: http://web.archive.org/web/20121115021307/http://www.evopet.com/products/1631; published on Nov. 15, 2012, 3 pgs.
"How Cereal Giant Kellogg's Keeps Its Product Pipeline Fresh", US News and World report, posted on May 7, 2006, http://www.usnews.com/usnews/bixtech/articles/060515/15best_print.htm, 6 pgs.
"Kibbles 'n Bits", http://www.kibblesnbits.com/varieties/brushingbites.aspx, downloaded Dec. 11, 2008, 2 pgs.

(Continued)

*Primary Examiner* — Jyoti Chawla

(57) ABSTRACT

Compositions and methods are disclosed for providing a pet food product comprising kibbles and one or more inclusions, such as dried fruits or vegetables. Specifically, the kibble may have one or more shapes to form an interlock, and/or the inclusions are oil-coated to provide for increased density and reduce the density differences between the inclusions and the kibbles, both features are useful for keeping an even distribution of kibbles and inclusions in a package or container.

19 Claims, 4 Drawing Sheets

(56) References Cited

U.S. PATENT DOCUMENTS

| | | |
|---|---|---|
| 5,478,570 A | 12/1995 | Sonohara |
| 5,480,641 A | 1/1996 | Casas-Perez |
| 5,505,969 A | 4/1996 | Wood et al. |
| 5,552,176 A | 9/1996 | Marino |
| 5,603,974 A | 2/1997 | Wood et al. |
| 5,690,988 A | 11/1997 | Lin et al. |
| 5,869,121 A | 2/1999 | Brescia et al. |
| 5,883,161 A | 3/1999 | Wood et al. |
| 5,968,569 A | 10/1999 | Cavadini et al. |
| 5,989,607 A | 11/1999 | Dieso et al. |
| 6,010,725 A | 1/2000 | Meister et al. |
| 6,042,857 A | 3/2000 | Jones et al. |
| 6,063,414 A | 5/2000 | Jones et al. |
| 6,117,477 A | 9/2000 | Paluch et al. |
| 6,132,786 A | 10/2000 | Poulos et al. |
| 6,150,004 A | 11/2000 | Oikawa et al. |
| D435,713 S | 1/2001 | Speck |
| 6,200,609 B1 | 3/2001 | Meister et al. |
| 6,218,013 B1 | 4/2001 | Wood et al. |
| 6,254,910 B1 | 7/2001 | Paluch |
| 6,312,746 B2 | 11/2001 | Paluch |
| 6,493,641 B1 | 12/2002 | Singh et al. |
| 6,495,176 B1 | 12/2002 | McGenity et al. |
| 6,517,877 B2 | 2/2003 | Gannon |
| 6,579,549 B1 | 6/2003 | Thrasher et al. |
| 6,635,301 B1 | 10/2003 | Howsam |
| 6,652,892 B2 | 11/2003 | McGenity et al. |
| 6,827,957 B2 | 12/2004 | Paluch et al. |
| 6,841,178 B2 | 1/2005 | Cupp et al. |
| 6,852,958 B2 | 2/2005 | Germain et al. |
| 7,037,708 B1 | 5/2006 | Runge et al. |
| 7,067,150 B2 | 6/2006 | Farber et al. |
| 7,122,370 B2 | 10/2006 | Porubcan |
| D531,383 S | 11/2006 | Dettmer et al. |
| 7,163,708 B2 | 1/2007 | Dalziel et al. |
| 7,189,390 B2 | 3/2007 | Zink et al. |
| 7,211,280 B1 | 5/2007 | Young et al. |
| 7,229,818 B2 | 6/2007 | Porubcan |
| 7,258,879 B1 | 8/2007 | Hodge et al. |
| 7,318,920 B2 | 1/2008 | Christenson |
| 7,331,252 B2 | 2/2008 | Pachov |
| 7,381,406 B2 | 6/2008 | Zink et al. |
| 7,390,520 B2 | 6/2008 | Dempsey et al. |
| 7,479,286 B2 | 1/2009 | Couzy et al. |
| 7,479,294 B2 | 1/2009 | Sokhey et al. |
| D588,326 S | 3/2009 | Fitzpatrick et al. |
| 7,547,527 B2 | 6/2009 | Baur et al. |
| 7,651,708 B2 | 1/2010 | Schlebusch et al. |
| 7,700,141 B2 | 4/2010 | Baillon et al. |
| 7,722,911 B2 | 5/2010 | Liu et al. |
| 7,763,298 B2 | 7/2010 | Archibald |
| 7,771,982 B2 | 8/2010 | Zink et al. |
| 7,838,057 B2 | 11/2010 | Schmidt et al. |
| 7,879,377 B2 | 2/2011 | Dahl et al. |
| 7,910,127 B2 | 3/2011 | Connolly et al. |
| 7,951,493 B2 | 5/2011 | Lin et al. |
| 7,998,473 B2 | 8/2011 | Boileau et al. |
| 8,034,601 B2 | 10/2011 | Boileau et al. |
| 8,137,731 B2 | 3/2012 | Pater et al. |
| 8,263,146 B2 | 9/2012 | Bengtsson-Riveros et al. |
| 8,268,374 B2 | 9/2012 | Capodieci |
| 8,475,834 B2 | 7/2013 | Perez et al. |
| 8,501,224 B2 | 8/2013 | Schert et al. |
| 8,529,965 B2 | 9/2013 | Yamka et al. |
| 8,697,174 B2 | 4/2014 | Teconchuk et al. |
| 8,771,675 B2 | 7/2014 | Zink et al. |
| 8,802,158 B2 | 8/2014 | Boileau et al. |
| 8,809,035 B2 | 8/2014 | Boileau et al. |
| 8,877,178 B2 | 11/2014 | Boileau et al. |
| 8,894,991 B2 | 11/2014 | Boileau et al. |
| 9,044,497 B2 | 6/2015 | Harel et al. |
| 9,072,310 B2 | 7/2015 | Harel et al. |
| 9,131,703 B2 | 9/2015 | Marchal et al. |
| 9,175,436 B2 | 11/2015 | Abrams |
| 9,192,177 B2 | 11/2015 | Boileau et al. |
| 9,295,656 B2 | 3/2016 | Ueda |
| 2001/0041202 A1 | 11/2001 | Dupont et al. |
| 2002/0009432 A1 | 1/2002 | Iwamoto et al. |
| 2003/0044492 A1 | 3/2003 | Knigge et al. |
| 2003/0077356 A1 | 4/2003 | Campbell et al. |
| 2003/0175387 A1 | 9/2003 | English |
| 2003/0215547 A1 | 11/2003 | Leyh |
| 2004/0033293 A1 | 2/2004 | Albert |
| 2004/0047896 A1 | 3/2004 | Malnoe et al. |
| 2004/0062833 A1 | 4/2004 | McGenity et al. |
| 2004/0253342 A1 | 12/2004 | Townsend et al. |
| 2005/0008735 A1 | 1/2005 | Pearce |
| 2005/0060707 A1 | 3/2005 | Tunney |
| 2005/0079244 A1 | 4/2005 | Giffard et al. |
| 2005/0100559 A1 | 5/2005 | Myatt et al. |
| 2005/0106132 A1 | 5/2005 | Porubcan |
| 2005/0153018 A1 | 7/2005 | Ubbink et al. |
| 2005/0158291 A1 | 7/2005 | Breton |
| 2005/0233038 A1 | 10/2005 | Weinberg |
| 2005/0266069 A1 | 12/2005 | Simmons et al. |
| 2005/0281910 A1 | 12/2005 | Schiffrin et al. |
| 2006/0062875 A1 | 3/2006 | Gopal |
| 2006/0062892 A1 | 3/2006 | Merrick |
| 2006/0099321 A1 | 5/2006 | Sievert |
| 2006/0105098 A1 | 5/2006 | Merrick |
| 2006/0124675 A1 | 6/2006 | Calicott |
| 2006/0134183 A1 | 6/2006 | Huetter et al. |
| 2006/0188611 A1 | 8/2006 | Unlu et al. |
| 2006/0204623 A1 | 9/2006 | Levin |
| 2006/0210675 A1* | 9/2006 | Gifford .................. A23K 10/20 426/106 |
| 2006/0228448 A1 | 10/2006 | Boileau et al. |
| 2006/0263416 A1 | 11/2006 | Brent, Jr. |
| 2007/0009647 A1 | 1/2007 | Huetter et al. |
| 2007/0059297 A1 | 3/2007 | Waldron et al. |
| 2007/0098744 A1 | 5/2007 | Knorr et al. |
| 2007/0148282 A1 | 6/2007 | Zubair et al. |
| 2007/0160589 A1 | 7/2007 | Mattson et al. |
| 2007/0218164 A1 | 9/2007 | Stojanovic |
| 2007/0251465 A1 | 11/2007 | Shafer et al. |
| 2007/0269553 A1 | 11/2007 | Le et al. |
| 2007/0269572 A1 | 11/2007 | Turner |
| 2008/0050479 A1 | 2/2008 | Hodge et al. |
| 2008/0095752 A1 | 4/2008 | Chiang et al. |
| 2008/0138464 A1 | 6/2008 | Townsend et al. |
| 2008/0145341 A1 | 6/2008 | Myatt et al. |
| 2008/0220126 A1 | 9/2008 | Boileau et al. |
| 2008/0248156 A1 | 10/2008 | Boileau et al. |
| 2008/0254177 A1 | 10/2008 | Lin et al. |
| 2008/0280274 A1 | 11/2008 | Freisen et al. |
| 2008/0299260 A1 | 12/2008 | Strahm |
| 2008/0302678 A1 | 12/2008 | Hunwisk et al. |
| 2008/0305094 A1 | 12/2008 | Pridmore-Merten |
| 2008/0305210 A1 | 12/2008 | Petersen |
| 2008/0311226 A1 | 12/2008 | Yamka et al. |
| 2008/0317905 A1 | 12/2008 | Yamka et al. |
| 2009/0017163 A1 | 1/2009 | Garbolino et al. |
| 2009/0110778 A1 | 4/2009 | Muscroft |
| 2009/0110802 A1 | 4/2009 | Pibarot et al. |
| 2009/0136163 A1 | 5/2009 | Kerr et al. |
| 2009/0186121 A1 | 7/2009 | Hutchison et al. |
| 2009/0214709 A1 | 8/2009 | Fuhrmeister et al. |
| 2009/0263542 A1 | 10/2009 | Lin et al. |
| 2009/0274796 A1 | 11/2009 | Yamka et al. |
| 2009/0274800 A1 | 11/2009 | Assenmacher et al. |
| 2009/0324761 A1 | 12/2009 | Khoo et al. |
| 2010/0003393 A1 | 1/2010 | Torney et al. |
| 2010/0047397 A1 | 2/2010 | Levin |
| 2010/0086659 A1 | 4/2010 | Schmidt |
| 2010/0092611 A1 | 4/2010 | Degre et al. |
| 2010/0098806 A1 | 4/2010 | Van Drunen |
| 2010/0136162 A1 | 6/2010 | Cupp et al. |
| 2010/0136201 A1 | 6/2010 | Bigeard et al. |
| 2010/0150870 A1 | 6/2010 | Young et al. |
| 2010/0189767 A1 | 7/2010 | Shimoni et al. |
| 2010/0233320 A1 | 9/2010 | Sunvoid et al. |
| 2010/0233756 A1 | 9/2010 | Sunvoid et al. |
| 2010/0266560 A1 | 10/2010 | Swaminathan et al. |
| 2010/0266727 A1 | 10/2010 | Swaminathan et al. |

(56) References Cited

U.S. PATENT DOCUMENTS

| | | |
|---|---|---|
| 2010/0303951 A1 | 12/2010 | Sunvoid et al. |
| 2010/0303966 A1 | 12/2010 | Sunvoid et al. |
| 2010/0303967 A1 | 12/2010 | Sunvoid et al. |
| 2010/0303968 A1 | 12/2010 | Sunvoid et al. |
| 2010/0303976 A1 | 12/2010 | Corrigan et al. |
| 2010/0303978 A1 | 12/2010 | Sunvoid et al. |
| 2010/0310750 A1 | 12/2010 | She et al. |
| 2010/0316769 A1 | 12/2010 | Czarnecki-Maulden et al. |
| 2011/0027419 A1 | 2/2011 | Sunvoid et al. |
| 2011/0076363 A1 | 3/2011 | Niehues |
| 2011/0139087 A1 | 6/2011 | Lang et al. |
| 2011/0159149 A1 | 6/2011 | Josephson et al. |
| 2011/0171348 A1* | 7/2011 | Kirejevas ............... A23K 50/40 426/61 |
| 2011/0287147 A1* | 11/2011 | Pannell ................ A23C 9/1315 426/89 |
| 2012/0021094 A1 | 1/2012 | Sunvoid et al. |
| 2013/0122154 A1 | 5/2013 | Villagran et al. |
| 2013/0129865 A1 | 5/2013 | Goold et al. |
| 2013/0251792 A1 | 9/2013 | Kowalski et al. |
| 2014/0161962 A1* | 6/2014 | Boebel ................... A23K 50/42 426/656 |
| 2015/0030679 A1 | 1/2015 | Becker et al. |

FOREIGN PATENT DOCUMENTS

| | | |
|---|---|---|
| CN | 101214011 A | 7/2008 |
| CN | 101411407 A | 4/2009 |
| CN | 101411408 A | 4/2009 |
| CN | 101669585 A | 3/2010 |
| CN | 101822324 A | 9/2010 |
| CN | 101822325 A | 9/2010 |
| CN | 101822326 A | 9/2010 |
| CN | 101822327 A | 9/2010 |
| CN | 101933560 A | 1/2011 |
| CN | 101999537 A | 4/2011 |
| CN | 102008025 A | 4/2011 |
| CN | 102008026 A | 4/2011 |
| CN | 102048047 A | 5/2011 |
| CN | 102048055 A | 5/2011 |
| CN | 102106479 A | 6/2011 |
| EP | 0258687 A1 | 3/1988 |
| EP | 0524359 A3 | 2/1993 |
| EP | 1036512 | 9/2000 |
| EP | 1932432 | 6/2008 |
| EP | 2060190 | 5/2009 |
| EP | 2255676 A1 | 12/2010 |
| GB | 1312910 A | 4/1973 |
| GB | 1433976 A | 4/1976 |
| GB | 2205476 | 12/1988 |
| GB | 2240253 A | 7/1991 |
| GB | 2357967 A | 7/2001 |
| GB | 2359746 A | 9/2001 |
| JP | S49131858 A | 12/1974 |
| JP | S57206338 | 12/1982 |
| JP | S62296847 A | 12/1987 |
| JP | H0670697 A | 3/1994 |
| JP | H0870787 A | 3/1996 |
| JP | H10271959 A | 10/1998 |
| JP | 2004123636 A | 4/2004 |
| JP | 2004329019 A | 11/2004 |
| JP | 2005304475 A | 11/2005 |
| JP | 2006158265 A | 6/2006 |
| JP | 2006180815 A | 7/2006 |
| JP | 2010088391 A | 4/2010 |
| JP | 2014534819 A | 12/2014 |
| KR | 20090100817 A | 9/2009 |
| KR | 20100023588 A | 3/2010 |
| KR | 20100023594 A | 3/2010 |
| RU | 2251364 | 5/2005 |
| TW | 201010628 A | 3/2010 |
| WO | 8905849 | 6/1989 |
| WO | 9507090 | 3/1995 |
| WO | 9517103 | 6/1995 |
| WO | 9534214 | 12/1995 |
| WO | 9716077 | 5/1997 |
| WO | 9805218 | 2/1998 |
| WO | 9909839 | 3/1999 |
| WO | 0041576 | 7/2000 |
| WO | 0047062 | 8/2000 |
| WO | 03018778 | 3/2003 |
| WO | 2004074496 | 9/2004 |
| WO | 2005047255 | 5/2005 |
| WO | 2005070232 | 8/2005 |
| WO | 2005092116 | 10/2005 |
| WO | 2006058373 | 6/2006 |
| WO | 2006064959 | 6/2006 |
| WO | 2007060539 | 5/2007 |
| WO | 2008092228 | 8/2008 |
| WO | 2010077356 A1 | 7/2010 |

OTHER PUBLICATIONS

"Smart Couponing", available at: http://web.archive.org/20111129033155/http://www.smartcouponing.com/index.php/2011/09/26/11-purina-kit-kaboodle-good-deal-at-walmart-/; published on Sep. 26, 2011; 3 pgs.

Anonymous, "Crispy and Tender Complete Adult Dog Food with Beef", Database GNPD, Mintel, http://www.gnpd.com, Oct. 2012, 3 pgs.

Anonymous, "Dry Cat Food", Database GNPD, Mintel: http://www.gnpd.com, Aug. 2009, 2 pgs.

Anonymous, "Original Cat Food", Database GNPD, Mintel, Dec. 2011, 2 pgs.

Anonymous, "Seaside Mix", Database GTND, Mintel, http://www.gnpd.com, Jul. 2012, 2 pgs.

Biourge, et al., "The Use of Probiotics in the Diet of Dogs", Journal of Nutrition, 128:2730S-2732S, Dec. 1998, American Society for Nutritional Sciences.

Glycerine: an overview, downloaded from archived internet file, http://www.aciscience.org/docs//Glycerine—an overview.pdf, dated Dec. 2008, 27 pages.

Iams ProActive Health Adult MiniChunks, Retrieved from URL https://web.archive.org/web/20111012222233/http://www.iams.com/dog-food/iams-proactive-health-adult-minichunks>, published Oct. 12, 2011, as per Wayback Machine, 4pp.

* cited by examiner

INTERLOCKING KIBBLE

CROSS-REFERENCE TO RELATED APPLICATIONS

This application is a national stage application, filed under 35 U.S.C. § 371, of International Patent Application No. PCT/US2016/018085, filed Feb. 16, 2016, which claims priority from U.S. Provisional Application No. 62/116,906, filed Feb. 16, 2015, all of which are incorporated by reference herein in their entirety.

FIELD OF INVENTION

The present invention relates to a pet product comprised of a plurality of pet food kibbles having a configuration for interlocking with each other when adjacently placed, wherein the configuration comprises one or more curves with predetermined radius on each piece. The present invention also relates to a method of preventing packaged kibbles and other inclusions within the same bag from separating from each other due to differential densities.

BACKGROUND

Pet food having kibbles pre-mixed with inclusions, such as dehydrated or freeze-dried fruit or vegetable pieces, dehydrated or freeze-dried meat pieces, or other non-kibble pieces such as meat analogs, are increasingly popular and are attractive to pets and pet owners. Usually the kibbles are mixed with an even distribution of a certain weight percentage of inclusions during processing and the resulting mixture is then packaged in a bag, box, or other containers suitable for pet food storage, transportation, display, and in-home consumption. However, because inclusions such as dehydrated or freeze-dried pieces are much lighter in density than the kibbles, the two portions would separate or segregate at various points during transport and handling with the heavier kibbles settling in the bottom of the bag (or whichever side that is placed closer to the ground), with the lighter dehydrated or freeze-dried pieces largely remaining at the surface or top of the bag. In addition, because freeze-dried pieces (and to some extent dehydrated pieces) are crispy and fragile, they are easily breakable into smaller pieces, their segregation from kibbles due to smaller weight and size worsens. When the pet owner scoops out from the bag a suggested amount or volume of pet food, food that has segregated would end up having too much or too little of the freeze-dried or dehydrated pieces and not enough or too many kibbles in each unit of food, with neither reflecting the desired weight percentage or distribution of the inclusions as provided and calculated for nutrition and caloric intake. The uneven distribution of the two portions of pet food is unlikely to be easily corrected at the consumer end by shaking the bag in an attempt to remix the two portions. Shaking tends to make the uneven distribution worse because migration and separation of portions of different densities increase during shaking, and the fragile pieces would crumble and break due to friction and pressures. A packaged pet food mixture having different portions unevenly distributed fails to deliver the intended product aesthetics, a consistent nutrient profile, affects the pet food palatability, alters the stool quality, and also frustrates the pet owner when feeding the pet, with or without an attempt to correct such uneven distribution. Therefore, a pet food with non-kibble inclusions evenly mixed, and remaining evenly mixed at any stage of the product's life cycle is necessary to better serve the pets and deliver the intended nutrition and aesthetics.

SUMMARY OF INVENTION

The present application overcomes problems inherent in the prior art and provides a pet food product and a method for making a pet food product that has one or more non-kibble inclusions evenly distributed at any stage of the product handling, including, without limitation, processing, packaging, transportation, display, storage, and in-home consumption.

One aspect of the present invention provides a pet food comprising kibbles and one or more oil-coated inclusions, wherein each of the inclusions is coated with a pre-determined weight percentage of oil that increases the density of the coated-inclusions. In another embodiment, the oil coating softens and makes pliable the inclusions, such that the oil coating prevents the inclusions from breakage. In some forms of the disclosure, the inclusion may be a whole or part of a fruit or a vegetable, including the same in a dehydrated or freeze-dried form. In some forms of the disclosure, the inclusion may be a meat chunk, including the same in a dehydrated or freeze-dried form. In other forms of disclosure, the inclusion may be a supplement. As provided herein, the inclusion is in a form selected from a group consisting of a piece, bit, slice, portion, nugget, glob, lump, and any combinations thereof. In some forms of the disclosure, the oil for coating the inclusion may be of animal origin such as chicken, tallow, or fish. In some other forms of the disclosure, the coating oil may derive from soy, sunflower, coconut, olive, canola, algae, vegetable oils, and other suitable oils of plant or microorganism origins, or any combinations thereof. In one particular form of the disclosure, the coating oil is refined and deodorized coconut oil.

In one embodiment, the weight percentage of the oil is based on the total weight of the inclusions after being coated with oil. Alternatively, the weight percentage of the coating oil is based on the total weight of the pet food mixture. In some embodiments, the density of inclusions is expressed as lb/cu ft, and is lighter than the kibble density. The process of coating the inclusion in oil increases the density of the inclusion. In a preferred embodiment, the density is increased such that it is closer to the density of the kibble. In one embodiment, the density of the kibbles is about 20-40, 25-35, or 22-32 lb/cu ft. In one embodiment, the coating oil increases the inclusion density from about 4-8 lb/cu ft to about 6-10 lb/cu ft, or from 10-14 lb/cu ft to about 16-20 lb/cu ft. In one embodiment, the density of the inclusions is increased such that it equals the density of the kibbles, or until the density of the inclusions is within 20 lb/cu ft of the density of the kibble. In another embodiment, the density of the inclusions, prior to being coated with oil, is less than 20% of the density of the kibble (all in lb/cu ft). Preferably, the coating of the oil increases the density of the inclusions by at least 10%, more preferably between 10% to 15%, still more preferably between 10% to 20%, and even more preferably between 15% and 25%. Such coated inclusions are thereby closer in density to the kibbles than the uncoated inclusions.

In some embodiments, the pet food mixture comprises up to 50 wt % oil-coated inclusions (wt % of the total weight of the pet food product). In some embodiments, the pet food mixture comprises up to 30-40 wt % oil-coated inclusions. In some embodiments, the pet food mixture comprises up to 20-30 wt % oil-coated inclusions. In some embodiments, the pet food mixture comprises up to 10-20 wt % oil-coated inclusions. In some embodiments, the pet food mixture comprises up to 1-10 wt % oil-coated inclusions. In one embodiment, the pet food mixture comprises 1.5-3 wt % of oil-coated inclusions.

Another aspect of the present disclosure provides a shaped kibble (100) having one or more configurations that comprises at least one pocket (210) formed by a curve (220) of a predetermined radius at the edge (200) of the kibbles. The shaped, or configured, kibbles interlock with each other when adjacently placed to form a lattice-like barrier (300). In one embodiment, the kibble is in a shape of crescent (102). In one embodiment, the kibble is in a shape of peanut (104). In one embodiment, the kibble is in a shape of star (106). In one embodiment, the kibble is in a shape of an x (108). In another embodiment, the kibble is in a shape of flower (110). In yet another embodiment, the kibble is in a shape of gear (112). The kibble can be configured in any shape having one or more curved portions having a radius of between 0.06 and 0.25 inches. The kibble comprises a convex curve having an angle of curvature between 90 and 180 degrees, preferably between 110 and 180 degrees, more preferably between 120 and 150 degrees. In these configurations, the curves (220) forming pockets and protruding members (212) are identified using the radius (inch), which is pre-determined according to the sizes and configurations of the kibbles. The kibble also comprises a concave curve having an angle of curvature up to about 270 degrees. As provided by the present disclosure, the lattice-like barrier comprises interlocks formed by the curve-comprising edges of the shaped kibbles that prevent the inclusions from moving within and through the pet food package. Further, the lattice-like barrier preferably prevents the inclusions from aggregating into one portion of the package, separating from the kibble. Advantageously, this provides and retains a consistently distributed product within the pet food package, even after the package has been transported and moved. Such transportion and movement generally leads to a separation and uneven or inconsistent distribution of inclusions in within conventionally-shaped kibble.

In another aspect of the present disclosure, a pet food product comprising an amount of at least two differently shaped kibbles and an amount of inclusions distributed within a package is provided. The differently shaped kibbles include curved pockets having an angle of curvature between 100 and 180 degrees that form an interlocking barrier that reduces relative movement of the kibbles. The number of pockets depends on the shape of the kibble. For example, a crescent includes one pocket, a peanut includes two pockets, a star includes three pockets, an x includes four pockets, a flower includes five pockets, and a gear includes six pockets. The shape of the pockets and the kibbles cooperatively form the interlocking barrier that reduces or prevents translocation or movement between the kibbles and the inclusions. Such a barrier helps to maintain the desired distribution between the kibbles and the inclusions despite movement and jostling of a package that includes kibbles and inclusions. Moving and jostling of the package is a common occurrence as the package is loaded for shipping, unloaded at a retail outlet, taken off a shelf by a consumer, and used and moved around by a consumer. Generally, all of this movement results in a shifting of the distribution of the kibbles and inclusions such that they are no longer evenly distributed within the package. When kibbles and inclusions in accordance with the present disclosure are used, the distribution of kibbles and inclusions is maintained such that the variation is preferably less than 25%, more preferably less than 20%, still more preferably less than 15%, even more preferably less than 10%, 9%, 8%, 7%, 6%, 5%, 4%, 3%, 2%, or 1% from the distribution when the product is initially placed in the package. In comparison, when conventional kibbles are used, the distribution of the kibbles and inclusions is not maintained and significantly worsens as the package experiences handling, movement, and jostling. When two packages containing kibbles of equal size and equal density and inclusions of equal size and equal density and differing only in that one package includes kibbles in accordance with the present disclosure and the other package includes conventional kibbles, are subjected to the same handling, movement, and jostling, the package having kibbles in accordance with the present disclosure have at least 10%, more preferably at least 15%, still more preferably at least 20% less, even more preferably at least 25% less, and still more preferably at least 30% less of a change in distribution than the package containing conventional kibbles. As can be appreciated, the more handling, movement, and jostling experienced by the packages results in a greater difference in distribution of the kibbles and inclusions within the packages. However, the package including kibbles made in accordance with the present invention maintains the distribution much better than the package with conventional kibbles.

An additional aspect of the present disclosure provides a pet food comprising shaped kibbles (100) having one or more configurations, and one or more inclusions, wherein each configuration comprises, at the edge (200) of the kibbles, at least one pocket (210) formed by a curve (220) of a predetermined radius; wherein the shaped kibbles interlock with each other when adjacently placed; and wherein the configurations of the kibble may be selected from a crescent (102), a peanut (104), a star (106), an x (108), a flower (110), a gear (112), as well as any other shape capable of interlocking with another shape and/or that has more than 6 curves. In some embodiments, the inclusions are oil-coated to increase density. In some other embodiments, the inclusions are not oil coated. In either embodiment, the interlocked shaped kibbles alone are sufficient to prevent inclusion segregation or aggregation of inclusions in one portion of the pet food bag.

Also provided in the present disclosure is a pet food comprising shaped kibbles (100) having one or more configurations, and one or more oil-coated inclusions, wherein each configuration comprises, at the edge (200) of the kibbles at least one pocket (210) formed by a curve (220) of a predetermined radius; wherein the shaped kibbles interlock with each other when adjacently placed; wherein the configurations of the kibble may be selected from a crescent (102), a peanut (104), a star (106), an x (108), a flower (110), a gear (112), as well as any other shape capable of interlocking with another shape and/or that has more than 6 curves; and wherein the density of the oil-coated inclusions is increased by 5%, 10%, 15%, 20% or 30% in comparison to the density of the inclusion prior to coating, where the density of the inclusions can be increased up to the point that it is closer in weight density to the shaped kibbles.

In one embodiment, a pet food is formed of 2 different kibble shapes (100), individually selected from the group consisting of crescent shaped kibbles, peanut shaped kibbles, star shaped kibbles, x shaped kibbles, cross shaped kibbles, flower shaped kibbles, gear shaped kibbles, and combinations thereof. The pet food further comprises inclusions selected from the group consisting of whole or parts of a fruit or a vegetable, including the same in a dehydrated or freeze-dried form, meat chunks, simulated meat chunks, supplements, and combinations thereof in a form selected from the group consisting of a piece, bit, slice, portion, nugget, glob, lump, and any combinations thereof. In some embodiments, the pet food consists of at least 2 different kibble shapes and one or more inclusions, wherein at least one inclusion is oil-coated.

In one embodiment, a pet food is formed of 3 different kibbles (100), wherein the pet food comprises respective quantities of crescent shaped kibbles, peanut shaped kibbles, and star-shaped kibbles. The pet food further comprises inclusions selected from the group consisting of whole or parts of a fruit or a vegetable, including the same in a dehydrated or freeze-dried form, meat chunks, simulated meat chunks, supplements, and combinations thereof in a form selected from the group consisting of a piece, bit, slice, portion, nugget, glob, lump, and any combinations thereof. In some embodiments, the pet food consists of at least 2 different kibble shapes and one or more inclusions, wherein at least one inclusion is oil-coated.

A pet food comprising a mono-shaped kibble (100) having a configuration comprising, at the edge (200) of the kibble at least one pocket (210) formed by a curve (220) of a predetermined radius, and one or more oil-coated inclusions, wherein the shaped kibbles interlock with each other to form a lattice-like barrier (300) when adjacently placed; wherein the densities of the shaped kibble and oil-coated inclusion are substantially equivalent; and wherein the configuration of the kibble is selected from a crescent (102), a peanut (104), a star (106), an x (108), a flower (110), a gear (112), as well as any other shape capable of interlocking with another shape and/or that has more than 6 curves; and wherein the density of the oil-coated inclusions is increased by 5%, 10%, 15%, 20% or 30% in comparison to that same inclusion before it is coated, where the density of the inclusions can be increased up to the point that it is closer in weight density to the shaped kibbles.

Advantageously, coating the inclusions in oil, especially when the inclusions are brittle, fragile and easily broken, such as when the inclusions are freeze-dried fruits or vegetables, increases the flexibility, pliability, or resilience of the inclusions and makes them more resistant to breakage.

Surprisingly, it was found that coating the inclusions in oil also helped the inclusions to retain their color for longer periods of time. Color fading of inclusions, such as dehydrated or freeze-dried fruits or vegetables, is a problem in the art as the color of such inclusions fades over time from photo-degradation or pigment oxidation in general. Faded inclusions are less visually appealing to the consumer and may result in product dissatisfaction despite the fact that flavors and nutritional values are not similarly reduced.

All ranges provided herein include each and every value in the range as well as all sub-ranges there-in-between as if each such value or sub-range was disclosed. Further, all aspects and embodiments of the disclosure comprise, consist essentially of, or consist of any aspect or embodiment, or combination of aspects and embodiments disclosed herein.

Other aspects and iterations of the invention are described in more detail below.

DETAILED DESCRIPTION

Figure 1:
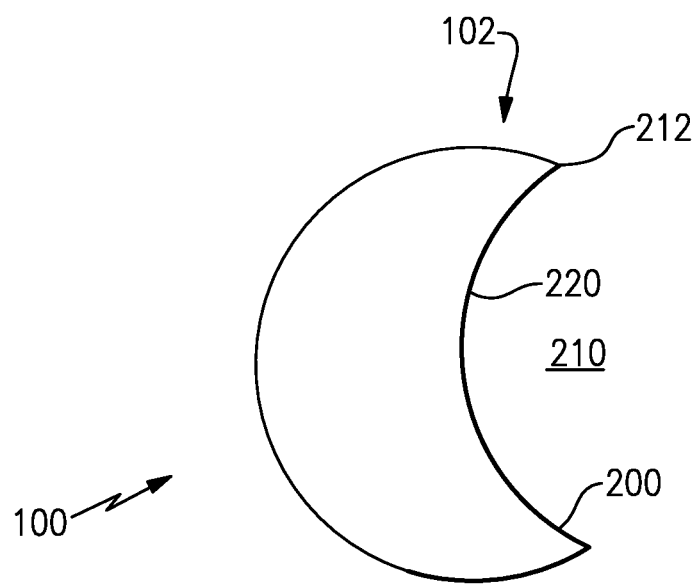
FIG. 1 depicts a crescent shaped kibble.

The present disclosure is related to shaped kibbles and their use with inclusions that are coated or uncoated with oil in order to provide a pet food comprising consistently evenly mixed portions of kibble and inclusion.

The present application provides a pet food comprising kibbles and one or more oil-coated inclusions, wherein each of the inclusions is coated with a pre-determined weight percentage of oil that increases the density of the coated inclusion. Inclusions are the portion of the pet food that is not comprised in the food mixture used to form the kibbles. Inclusions and kibbles in one pet food product are physically separable. Inclusions are mixed with kibbles to enhance the flavor, nutrition, mouth-feel, consumer appeal, and diversity, among other desirable features. The inclusions may be a whole or part of a fruit or a vegetable, a meat chunk, or a supplement. The inclusions may be fresh, cooked, dehydrated or freeze-dried. The inclusion may be in the form of a piece, bit, nugget, glob, or lump. In one embodiment, the pet food comprises two or more inclusions, which may be selected from different kinds of fruit, vegetable, meat, supplement, and any combinations thereof. Suitable fruits for use as inclusions include, but are not limited to, apples, tomatoes, bananas, pears, strawberries, cranberries, blueberries, raspberries, and the like. Suitable vegetables for use as inclusions include, but are not limited to, sweet potatoes, potatoes, legumes/beans, pumpkin, peas, zucchini, celery, broccoli, cabbage, carrots, cucumbers, green beans. Suitable meat sources include, but are not limited to, hogs, cattle, sheep, goats, deer, buffalo, kangaroo, alligator, snail, chicken, duck, goose, turkey, guinea hen, and the like. Suitable supplements for use as inclusions include, but are not limited to, flavor enhancers, vitamins, minerals, nutrient supplements, whole food supplements, prebiotics, probiotics, and any combinations thereof. Suitable vitamins for pet food, which may be supplied by various sources, include, but are not limited to sources supplying vitamin B1, B2, B3, B12, vitamin C, vitamin E, vitamin D, niacin (also known as B3 or vitamin PP), biotin (vitamin H), menadione (vitamin K), folic acid (vitamin B9), pyridoxine (B6), vitamin A, and any combinations thereof. Suitable minerals, which may be supplied by various sources, include, but are not limited to, calcium, potassium, magnesium, sodium, iron, phosphorus, zinc, manganese, iodine, selenium, cobalt, and any combinations thereof. In general, vitamins and minerals are combined with a carrier and/or a flavorant and formed into a shape and/or size that is distinguishable from the shape and/or size of the kibble.

Suitable coating oils for the inclusion include, without limitation, chicken fat, meat tallow, or fish oil or those derived from soy, sunflower, coconut, olive, canola, algae, and other suitable oils of plant, animal or microorganism origins, or any combinations thereof. The coating oil may be raw, refined, powdered, or whole. Oils may also be deodorized, non-GMO, organic, free-from antibiotics or hormones, or any combination thereof. Oil for coating may be chosen for its flavor, nutrition value, physical properties, and/or its ability to stabilize natural or artificial food color of the product to be coated. The coating oil may further comprise optional additives including, without limitation, flavorings, colorings, vitamins, minerals, nutrient supplements, natural and artificial preservatives, antioxidants, processing aids, and any combinations thereof. In one embodiment, the coating oil is refined and deodorized coconut oil. In one embodiment, the percentage of the coating oil is based on the total weight of the oil when compared to the weight of the pet food product comprising the kibbles and the oil-coated inclusions. In another embodiment, the percentage of the coating oil is based on the total weight of the oil-coated inclusions in the pet food product comprising a mixture of kibbles and oil-coated inclusions. The present disclosure provides that the percentage of the coating oil is determined by the disparity in the densities of the kibbles and non-coated inclusions used in one particular pet food mixture. The percentage of coating oil added should minimally be sufficient to increase the density of the inclusions.

A suitable weight percentage of the coating oil is one that increases the density of the post-coating inclusions. In one embodiment, the density of the inclusion is increased by at least 1 lb/cu ft, more preferably by at least 2 lb/cu ft, where increases such as 1.1, 1.2, 1.3, 1.4, 1.5, 1.6, 1.7, 1.8, 1.9, 2.1, 2.2, 2.3, 2.4, 2.5, 2.6, 2.7, 2.8, 2.9, 3, 1-3, 1-5, 2-3, 4-5 lb/cu ft, and higher are envisioned. In another embodiment, the density is increased to a point where it is at least 10%, more preferably at least 20%, and still more preferably at least 30% closer to the density of the kibbles used in the particular pet food mixture. Density is defined as the number of mass (m) per unit volume (V). In the present disclosure, the density of the kibbles and the inclusions may be expressed as pounds per cubic feet or inch (lb/cu ft or lb/cu in). In some embodiments, the density of the kibbles is between about 20 and about 40 lb/cu ft. In some embodiments, the density of the kibbles is between about 25 and about 35 lb/cu ft. In some embodiments, the density of the kibbles is between about 27 and about 30 lb/cu ft. In some embodiments, the density of the kibbles is about 28 lb/cu ft. In some embodiments, the density of the inclusion before coating is between about 4 and 8 lb/cu ft, and after coating is between about 6 and about 10 lb/cu ft. In some embodiments, the density of the inclusion before coating is about 6 lb/cu ft, and after coating is 8 lb/cu ft.

The weight percentage of the coating oil is calculated into the fat content of the pet food product in compliance with the Association of American Feed Control Officials (AAFCO) nutrition requirements or other governing standards. Preferably, the portion of the pet food mixture with the lighter density is the inclusions, such that if a certain weight percentage of coating oil is needed to equalize the density of the inclusions and kibbles, the coating oil is to be applied to the inclusions. Preferably, the relative size of the kibbles and the inclusions is no more than 4× (i.e. the kibble is not more than 4 times larger than the inclusion, or the inclusion is not more than 4 times larger than the kibble), or no more than 3×, or no more than 2×. Thus, the ratio of the size of the kibble and inclusions can be 1:1, 1:2, 1:3, and 1:4, where the ratio can be either kibble to inclusions or inclusions to kibble. In view of the present disclosure, one skilled in the art can control the size of the inclusions within a desired range, while reducing the density disparity between the kibbles and the inclusions by coating the inclusions with a desired amount of oil.

Other than making the inclusion heavier in density, another advantage of coating an inclusion is to make the inclusion more pliable to prevent breakage or crushing during handling at any stage. By coating dehydrated or freeze-dried fruits or vegetable, the coating oil makes the inclusions less inflexible, and therefore reduces the breakage of the inclusion into smaller pieces which are even more readily to segregate from the kibbles and settle on the surface of the pet food mixture. In one embodiment, the pet food product comprises up to 50 wt % (based upon the total weight of the pet food product; same below and throughout the disclosure, unless otherwise stated) of one or more oil-coated inclusions. In one embodiment, the pet food product comprises 1 wt % to 10 wt % of oil-coated inclusions. In one embodiment, the pet food product comprises 10 wt % to 20 wt % of oil-coated inclusions. In one embodiment, the pet food product comprises 20 wt % to 30 wt % of oil-coated inclusions. In one embodiment, the pet food product comprises 30 wt % to 40 wt % of oil-coated inclusions. In another embodiment, the pet food product comprises 40 wt % to 50 wt % of oil-coated inclusions. In one embodiment, the coating oil of the inclusions comprises between about 5 wt % to about 30 wt % of the total weight of the oil coated inclusions. In one embodiment, the coating oil of the inclusions comprises between about 10 wt % to about 25 wt % of the total weight of the oil coated inclusions. In one embodiment, the coating oil of the inclusions comprises between about 12 wt % to about 18 wt % of the total weight of the oil coated inclusions. In one embodiment, the pet food product comprises 1.5-3 wt % of inclusions. In one particular embodiment, the pet food product comprises 1.5-3 wt % of inclusions, wherein the inclusions are freeze-dried fruits and vegetables, wherein the coating oil of the inclusions is a coconut oil, which comprises 13-15 wt % of the total weight of the oil coated inclusions.

In addition to increasing the density of inclusions in a pet food mixture by oil coating, the present application provides kibble configurations to further improve the distribution of inclusions in the pet food mixture. Additionally, the distribution of the inclusions is retained over time despite movement of the package holding the kibble and inclusions. As disclosed, the present application additionally provides for shaped kibbles having one or more configurations comprising, at the edge (200) of the kibbles, at least one pocket (210) formed by a curve (220) of a predetermined radius; wherein the shaped kibbles interlock one with another when adjacently placed to form a lattice-like barrier (300). The configurations of the kibble may be selected from a crescent (102), a peanut (104), a star (106), an x (108), a flower (110), a gear (112), and any other shape capable of interlocking with another shape and/or that has more than 6 curves.

FIG. 1 depicts a shaped kibble having a configuration of a crescent (102). A crescent shaped kibble has one curve of a predetermined radius.

Figure 2:
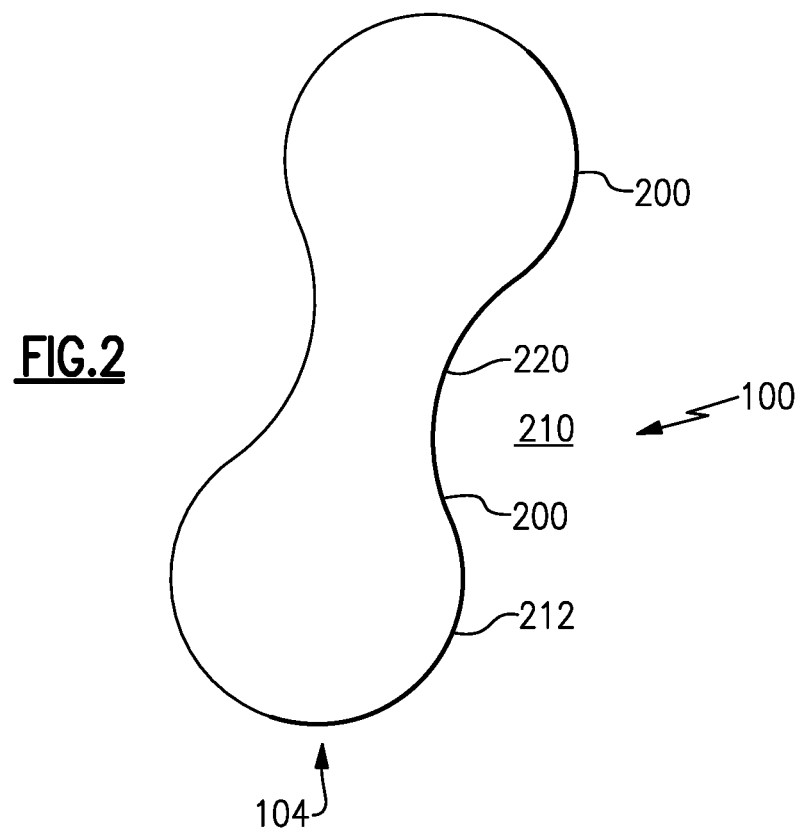
FIG. 2 depicts a peanut shaped kibble.

FIG. 2 depicts a shaped kibble having a configuration of a peanut (104). A peanut shaped kibble has two curves of a predetermined radius.

Figure 3:
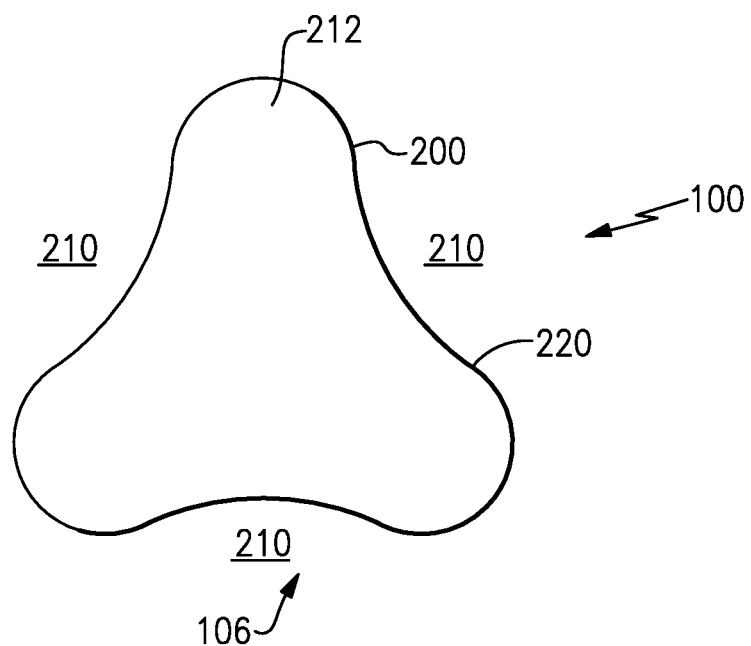
FIG. 3 depicts a star shaped kibble.

FIG. 3 depicts a shaped kibble having a configuration of a star (106). A star shaped kibble has three curves of a predetermined radius.

Figure 4:
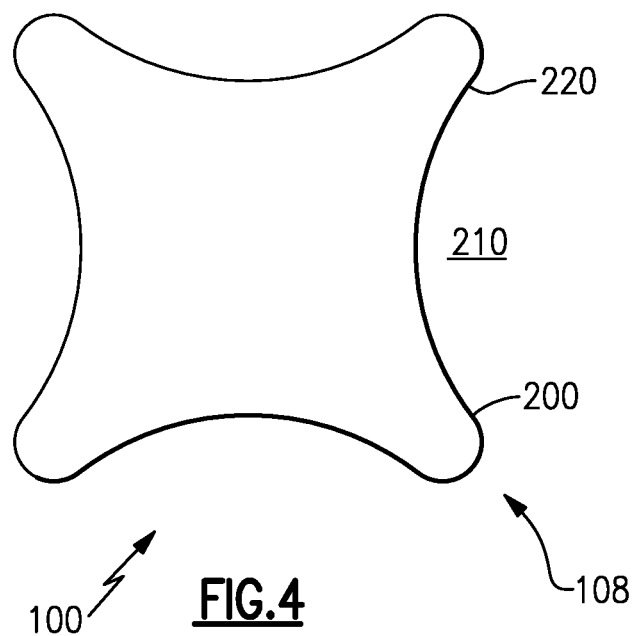
FIG. 4 depicts an x shaped kibble.

FIG. 4 depicts a shaped kibble having a configuration of an x (108). An x shaped kibble has four curves of a predetermined radius.

Figure 5:
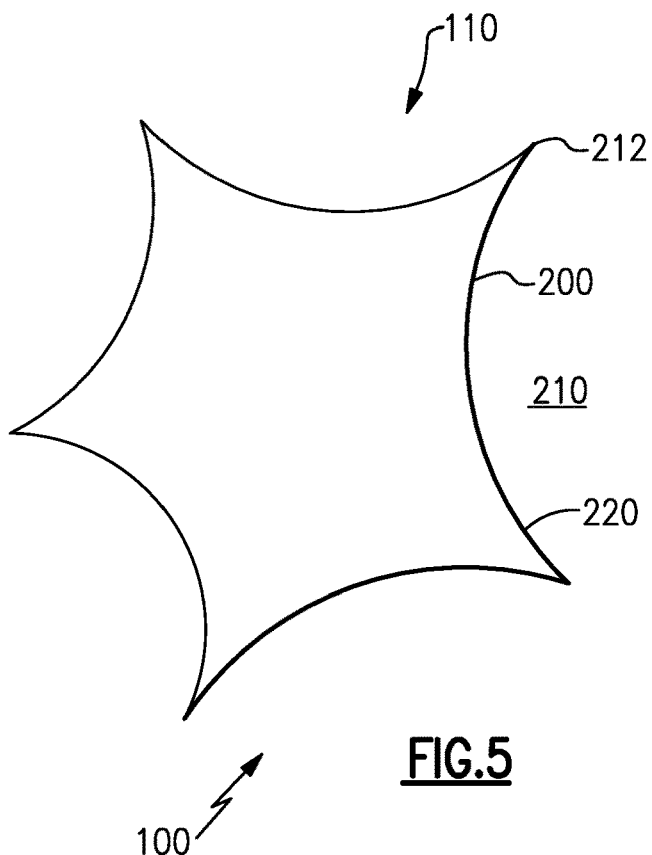
FIG. 5 depicts a flower shaped kibble.

FIG. 5 depicts a shaped kibble having a configuration of a flower (110). A flower shaped kibble has five curves of a predetermined radius.

Figure 6:
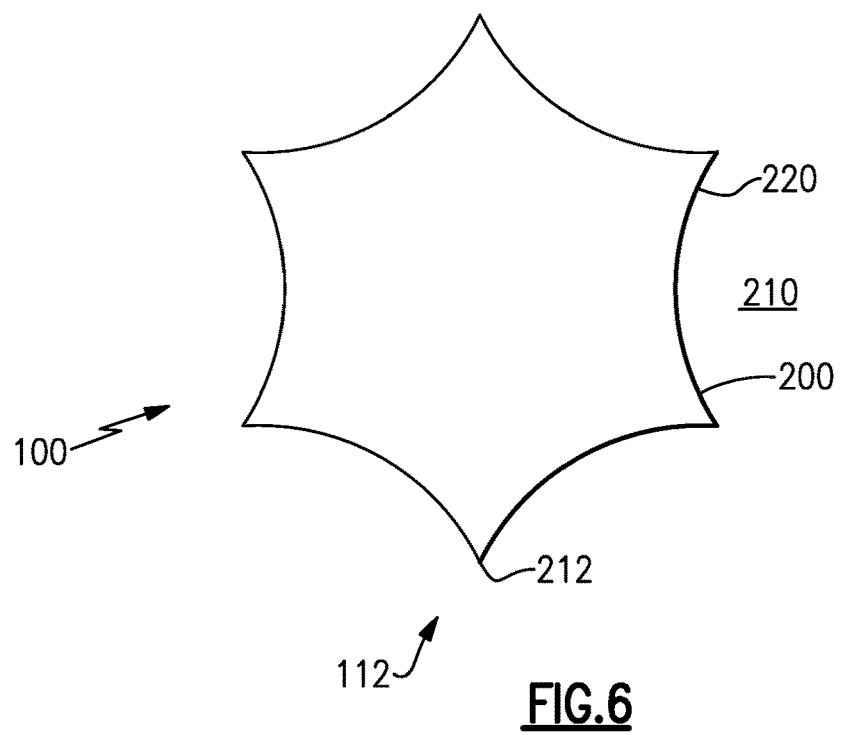
FIG. 6 depicts a gear shaped kibble.

FIG. 6 depicts a shaped kibble having a configuration of a gear (112). A gear shaped kibble has six curves of a predetermined radius.

The configurations of the shaped kibbles also include any capable of interlocking with another shape and/or those having more than 6 curves at the edge of the kibbles.

Figure 7:
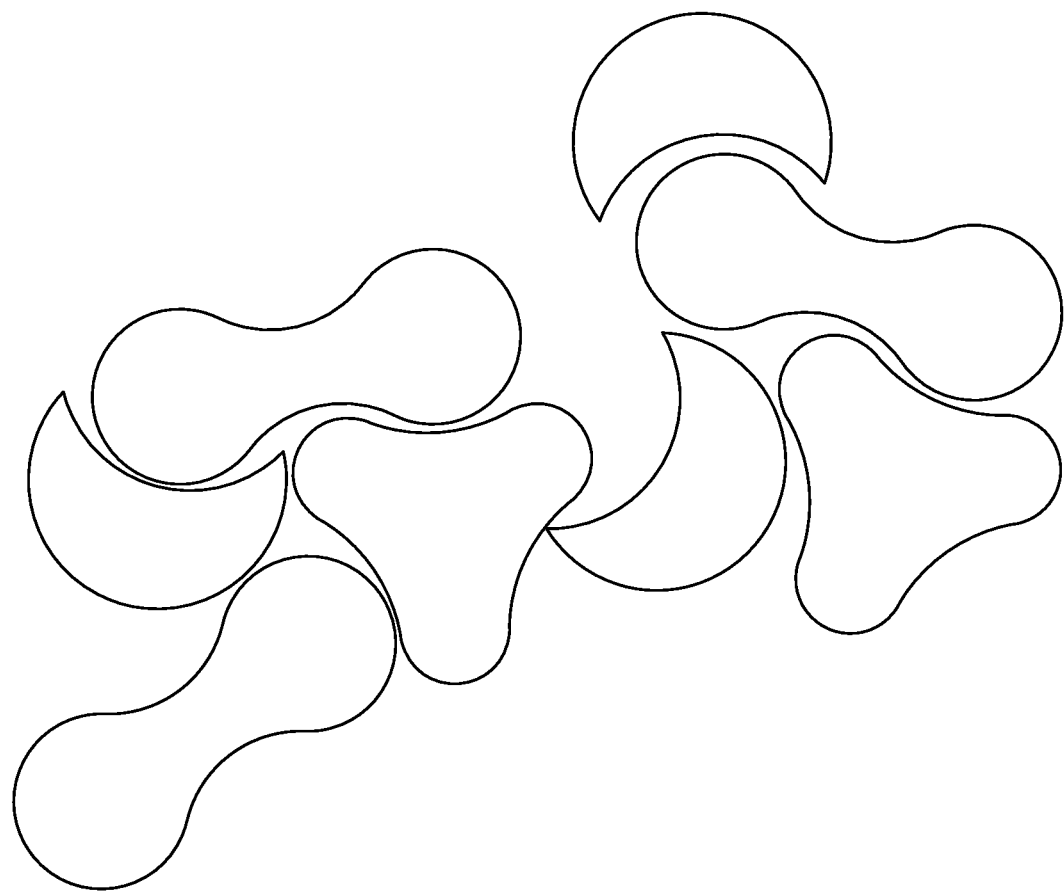
FIG. 7 depicts a lattice barrier formed by the interlocking kibbles.

Every curve (220) at the edge (200) of the kibbles provides a pocket (210) that has a caved-in space; while every two adjacent curves (220) provide a protruding member (212) extending out from the center of the kibble (except for the crescent (102) shape, the two protruding members (212) are formed by one curve and the remaining edge of the kibble). Each configuration disclosed herein has at least one pocket and at least one protruding member. When a sufficient number of kibbles having pockets and kibbles with protruding members are placed in a given space, the pockets and the protruding members lock together to fill in the space otherwise left between unshaped kibbles having a round or oval edge. The higher the number of kibbles having pockets and kibbles with protruding members that are placed in a given space, the less of a gap that will remain between the kibbles. This configuration effectively forms a lattice-like barrier (300) (FIG. 7) that inhibits or prevents the inclusions from shifting through the kibbles and settling to the bottom of a package containing the kibbles and inclusions, thereby increasing the number of inclusions that are the surface or within a top portion of the pet food and reducing the number of inclusions that are at the bottom or in the lower portions of the pet food. According to embodiments herein, kibbles of one or more shapes can be mixed together to provide interlocking barrier. In one embodiment, the pet food mixture has mono-shaped kibbles and inclusions. In one embodiment, the pet food mixture has two shapes of kibbles and inclusions. In another embodiment, the pet food mixture has at least three shapes of kibbles and inclusions. In a pet food mixture having kibbles of more than one shape, there may be any percentage (in quantity, weight, or volume) of each.

The curve (220) or the pocket (210) formed may be described by a predetermined radius and an angle of curvature. The kibble can be configured in any shape having one or more curved portions having a radius of between 0.06 and 0.25 inches. The kibble preferably has an angle of curvature between 90 and 180 degrees, preferably between 100 and 170 degrees, more preferably between 120 and 150 degrees. For example, for large kibbles, the radius of the pocket can be from about 0.108 to 0.129 inches in the crescent configuration, about 0.172 to 0.212 inches in the star configuration, and about 0.102 to 0.132 inches in the peanut configuration. In another set of smaller kibbles, the radius of the pocket is about 0.094 to about 0.119 inches in the crescent configuration, about 0.118 to about 0.15 inches in the star configuration, and about 0.077 to about 0.095 inches in the peanut configuration. It is understood that the radius is dependent upon the size of the kibble and so such sizes will be determinable by those of skill in the art. A proper radius is one capable of effectively forming an interlocking pocket and protruding member in view of the size of the kibbles that are randomly placed adjacent to each other.

The shaped kibbles can be manufactured by any process suitable for producing kibble. Preferably, the kibbles are manufactured using a process selected from the group consisting of injection molding, clamshell molding, extrusion, cold forming extrusion, rotary molding, or any combinations thereof. One of skill in the art understands how to apply different processes with proper settings and adjustment to achieve kibbles with certain ingredients having predetermined detention, size, shape, texture, gelatinization level etc.

As disclosed herein, the shaped kibbles can be mixed with inclusions with or without an oil coating to provide a kibble/inclusion pet food having improved distribution of each relative to each other within the mixture as compared to a pet food comprising a mixture of conventional kibbles and inclusions. As such, the present application provides for a pet food comprising shaped kibbles having one or more configurations, and one or more inclusions, wherein each configuration comprises, at the edge (200) of the kibbles, at least one pocket (210) formed by a curve (220) of a predetermined radius; wherein the shaped kibbles interlock with each other when adjacently placed; and wherein the configurations of the kibble may be selected from a crescent (102), a peanut (104), a star (106), an x (108), a flower (110), a gear (112), and any other shape capable of interlocking with another shape and/or that has more than 6 curves. The interlocking by the curve-comprising edge of the shaped kibbles can form a lattice-like barrier (300) preventing inclusions, whether of smaller size or lighter density, from settling, or gathering, in a section(s), rather than staying evenly mixed in the pet food mixture.

The present application further provides for a pet food comprising shaped kibbles having one or more configurations, and one or more oil-coated inclusions, wherein each configuration comprises, at the edge (200) of the kibbles at least one pocket (210) formed by a curve (220) of a predetermined radius; wherein the shaped kibbles interlock with each other when adjacently placed; wherein the configurations of the kibble may be selected from a crescent (102), a peanut (104), a star (106), an x (108), a flower (110), a gear (112), and any other shape that has more than 6 curves; and wherein the densities of the shaped kibbles and oil-coated inclusions are substantially equivalent. The lattice-like barrier (300) formed by the interlocking kibbles via their curve-comprising edges, in combination with the the increased density of the inclusions after being coated with oil, prevent inclusions and kibbles from separating and settling into different sections in the pet food.

The present application further provides for a pet food comprising a mono-shaped kibble having a configuration comprising, at the edge (200) of the kibble at least one pocket formed by a curve (220) of a predetermined radius, and one or more oil-coated inclusions, wherein the shaped kibbles interlock with each other to form a lattice-like barrier (300) when adjacently placed; wherein the densities of the shaped kibble and oil-coated inclusion are at a ratio between 10:1 and 1:1, or any other ratio as desired; and wherein the configuration of the kibble is selected from a crescent (102), a peanut (104), a star (106), an x (108), a flower (110), a gear (112), as well as any other shape capable of interlocking with another shape and/or that has more than 6 curves. The lattice-like barrier (300) formed by the interlocking of the shaped kibbles through their curve-comprised edges, as well as the increased density of the inclusions after being coated with oil, prevents or reduces the incidence of inclusions and kibbles from separating, settling, or gathering, in respective sections in the pet food.

As disclosed herein, a pet food mixture having shaped interlocking kibbles, and/or oil-coated inclusions resolves the problem of uneven distribution of the portions in the mixture due to density disparity, and thereby delivers consistent and balanced ingredient and nutrition composition in every serving.

EXAMPLES

The following examples are simply intended to further illustrate and explain the present invention. The invention, therefore, should not be limited to any of the details in these examples.

Example 1—A Pet Food Mixture Having Dehydrated Vegetables and Fruits and Mono-Shaped Kibbles

TABLE 1

Pet Food Mixture 1

Kibbles

| | |
|---|---|
| Appx. Wt % | 90 wt % |
| Density | 25 lb/cu ft |
| Shape | Mono-shape; star shape with pocket radius of 0.19 inch |

Inclusions

| | |
|---|---|
| Appx. Wt % | 10% |
| Density | 8 lb/cu ft |
| Fruits wt % | 4.5 wt % |
| Vegetables wt % | 4 wt % |
| Meats wt % | 0 |
| Coating oil wt % | Coconut oil; 1.5 wt % (of total weight of pet food), or 15 wt % of total weight of the coated inclusions. |

Example 2—A Pet Food Mixture Having Freeze-Dried Vegetables and Fruits and Two-Shaped Kibbles

TABLE 2

Pet Food Mixture 2

Kibbles

| | |
|---|---|
| Appx. Wt % | 95 wt % |
| Density | 22 lb/cu ft |
| Shape | Crescent shape with pocket radius of 0.12 inch; and star shape with pocket radius of 0.19 inch |

Inclusions

| | |
|---|---|
| Appx. Wt % | 5% |
| Density | 8 lb/cu ft |
| Fruits wt % | 2.5 wt % |
| Vegetables wt % | 2 wt % |
| Meats wt % | 0 |
| Coating oil wt % | Coconut oil; 0.5 wt % (of total weight of pet food), or 11 wt % of total weight of the coated inclusions. |

Example 3—A Pet Food Mixture Having Freeze-Dried Meats and Mono-Shaped Kibbles

TABLE 3

Pet Food Mixture 3

Kibbles

| | |
|---|---|
| Appx. Wt % | 95 wt % |
| Density | 22 lb/cu ft |
| Shape | Crescent shape with pocket radius of 0.12 inch; and star shape with pocket radius of 0.19 inch |

Inclusions

| | |
|---|---|
| Appx. Wt % | 5 wt % |
| Density | 10 lb/cu ft |
| Meats wt % | 4.5 wt % |
| Coating oil wt % | Coconut oil; 1 wt % (of total weight of pet food), or 10 wt % of total weight of the coated inclusions. |

Example 4—a Pet Food Mixture Having Freeze-Dried Meats and Mono-Shaped Kibbles of Similar Density

TABLE 4

Pet Food Mixture 4

Kibbles

| | |
|---|---|
| Appx. Wt % | 95 wt % |
| Density | 15 lb/cu ft |
| Shape | Peanut shape with pocket radius of 0.12 inch |

Inclusions

| | |
|---|---|
| Appx. Wt % | 5 wt % |
| Density | 12 lb/cu ft |
| Meats wt % | 4.5 wt % |
| Coating oil wt % | Coconut oil; 0.5 wt % (of total weight of pet food), or 10 wt % of total weight of the coated inclusions. |

Example 5—Texture Performance Analysis Comparing Inclusions with and without Oil-Coating Dehydrated or freeze-dried peas, green beans, sweet potato, apple, and cranberry, which are suitable for being used as non-kibble inclusions were tested for texture performance before and after oil coating using Bulk Shear analysis. The coating oil used was coconut oil. The parameters determining the overall texture characteristics of the samples include:

Firmness—defined as the maximum/peak force on the graph (N);

Distance—defined as the distance from start to the maximum/peak force (mm);

Shear Work—defined as the area under the curve from start to the peak force (N.sec); it measures the energy required to shear the product;

Adhesive Strength—defined as the absolute negative peak force on the graph (N); the force is measured as the probe returns to its original position; and Adhesive Work—defined as the area under the curve from the start of the negative peak to the absolute negative peak force (N.sec).

TA HDplus Texture Analyzer (Texture Technologies Corporation, Hamilton, Mass.) was used to carry out the Bulk shear analysis. The testing schematic using Kramer shear or Mini-Kramer shear is shown in Table 5. The sample amounts and number of replicates were determined based on the amount of sample received.

TABLE 5

Bulk Shear Analysis Testing Schematic

| Sample (coated & uncoated) | Test | Sample amount | Replicates |
|---|---|---|---|
| Green Beans | Kramer shear | 12 g | 4 |
| Sweet Potatoes | Kramer shear | 20 g | 3 |
| Apples | Kramer shear | 20 g | 4 |
| Peas | Mini-Kramer shear | Filled up mini-Kramer cell | 10 |
| Cranberries | Mini-Kramer shear | Filled up mini-Kramer cell | 10 |

Due to varying size, the green beans, sweet potatoes, and apples were analyzed using the Kramer Shear Cell (5-blade) while the peas and cranberries were analyzed using a mini- Kramer Shear Cell. The settings for Kramer Shear Analysis were provided in Table 6 and 7:

TABLE 6

The settings for Kramer Shear Analysis

TA Settings:

Test Mode: Compression
Pre-Test Speed: 5.00 mm/sec
Test Speed: 2.00 mm/sec
Post-Test Speed: 10.00 mm/sec
Target Mode: Strain
Strain: 90%
Trigger Type: Auto (Force)
Trigger Force: 40.0 g
Advanced Options: Off
Test Configuration Settings:

Data Acquisition: 250 PPS
Probe Selection: TA-91 Kramer Shear Press with 5 blades and TA-90 base
Pre-Test: Clear previous graphs must be selected
Post-Test: Run macro after autosave must be selected
Graph Preference Settings:

X Axis: Time (sec)
Y Axis: Force (N)
Load Cell:

500 kg

TABLE 7

The settings for mini-Kramer Shear Analysis

TA Settings:

Test Mode: Compression
Pre-Test Speed: 1.00 mm/sec
Test Speed: 5.00 mm/sec
Post-Test Speed: 5.00 mm/sec
Target Mode: Strain
Strain: 80%
Trigger Type: Auto (Force)
Trigger Force: 5.0 g
Advanced Options: Off
Test Configuration Settings:

Data Acquisition: 250 PPS
Probe Selection: TA-91M mini Kramer and TA-90 base
Pre-Test: Clear previous graphs must be selected
Post-Test: Run macro after autosave must be selected
Graph Preference Settings:

X Axis: Time (sec)
Y Axis: Force (N)
Load Cell:

500 kg

The bulk shear texture analyses were able to demonstrate overall differences between the uncoated and coated samples of green beans, sweet potatoes, apples, and cranberries, but not between uncoated and coated peas. Based on ANOVA single factor analysis, the uncoated and coated peas (Table 12) were found to be similar in all parameters: firmness, distance to peak force, and shear work ($p > 0.05$). The uncoated green beans (Table 8), sweet potatoes (Table 9), apples (Table 10), and cranberries (Table 11) were all found to be statistically different from their corresponding coated samples ($p < 0.05$).

TABLE 8

Bulk Kramer Shear Analysis of Green Beans

| Replicates | Firmness (N) | | Shear Work (N · sec) | | Adhesive Strength (N) | | Adhesive Work (N · sec) | |
|---|---|---|---|---|---|---|---|---|
| | UC | C | UC | C | UC | C | UC | C |
| 1 | 398.2 | 273.7 | 3541.6 | 1563.0 | 16.7 | 7.9 | 20.2 | 5.1 |
| 2 | 469.6 | 237.1 | 3354.0 | 1442.3 | 18.3 | 12.6 | 16.8 | 4.9 |
| 3 | 440.1 | 282.7 | 3713.1 | 1550.4 | 17.5 | 7.4 | 20.5 | 8.3 |
| 4 | 403.7 | 272.7 | 3334.8 | 1282.1 | 13.6 | 9.5 | 10.4 | 6.6 |
| Average | 427.9 | 266.5 | 3485.9 | 1459.5 | 16.5 | 9.3 | 17.0 | 6.2 |
| Std Dev | 33.4 | 20.2 | 178.0 | 130.1 | 2.0 | 2.3 | 4.7 | 1.6 |
| CV | 7.8 | 7.6 | 5.1 | 8.9 | 12.4 | 24.9 | 27.6 | 25.5 |

(UC = uncoated, C = coated, Std Dev = Standard Deviation, CV = Coefficient of Variation)

TABLE 9

Bulk Kramer Shear Analysis of Sweet Potatoes

| Replicates | Firmness (N) | | Shear Work (N · sec) | | Adhesive Strength (N) | | Adhesive Work (N · sec) | |
|---|---|---|---|---|---|---|---|---|
| | UC | C | UC | C | UC | C | UC | C |
| 1 | 1254.2 | 866.1 | 9177.2 | 5065.1 | 72.4 | 43.9 | 119.3 | 56.9 |
| 2 | 1262.5 | 770.3 | 10891.8 | 4780.9 | 52.1 | 18.7 | 75.8 | 20.5 |
| 3 | 1066.3 | 777.9 | 8980.5 | 5549.7 | 63.6 | 22.7 | 152.2 | 21.9 |
| Average | 1194.4 | 804.8 | 9683.2 | 5131.9 | 62.7 | 28.4 | 115.8 | 33.1 |
| Std Dev | 111.0 | 53.2 | 1051.3 | 389.0 | 10.2 | 13.5 | 38.3 | 20.6 |
| CV | 9.3 | 6.6 | 10.9 | 7.6 | 16.3 | 47.6 | 33.1 | 62.3 |

(UC = uncoated, C = coated, Std Dev = Standard Deviation, CV = Coefficient of Variation)

TABLE 10

Bulk Kramer Shear Analysis of Apples

| Replicates | Firmness (N) | | Shear Work (N · sec) | | Adhesive Strength (N) | | Adhesive Work (N · sec) | |
|---|---|---|---|---|---|---|---|---|
| | UC | C | UC | C | UC | C | UC | C |
| 1 | 923.8 | 787.2 | 8601.7 | 5749.4 | 62.7 | 36.9 | 190.6 | 39.8 |
| 2 | 1140.3 | 825.5 | 9522.7 | 5461.5 | 58.4 | 22.2 | 178.1 | 40.3 |
| 3 | 1029.2 | 842.5 | 8841.5 | 6387.6 | 47.4 | 29.3 | 115.9 | 40.8 |
| 4 | 950.0 | 844.0 | 6117.6 | 4808.3 | 40.3 | 27.9 | 79.6 | 34.7 |
| Average | 1010.8 | 824.8 | 8270.9 | 5601.7 | 52.2 | 29.1 | 141.0 | 38.9 |
| Std Dev | 97.3 | 26.4 | 1487.6 | 655.4 | 10.2 | 6.0 | 52.4 | 2.8 |
| CV | 9.6 | 3.2 | 18.0 | 11.7 | 19.6 | 20.7 | 37.1 | 7.3 |

(UC = uncoated, C = coated, Std Dev = Standard Deviation, CV = Coefficient of Variation)

TABLE 11

Bulk Mini-Kramer Shear Analysis of Cranberries

| Replicates | Firmness (N) | | Distance to Peak Force (mm) | | Shear Work (N · sec) | |
|---|---|---|---|---|---|---|
| | UC | C | UC | C | UC | C |
| 1 | 269.2 | 203.7 | 30.1 | 33.7 | 425.5 | 340.2 |
| 2 | 277.8 | 224.1 | 32.5 | 31.3 | 452.6 | 347.7 |
| 3 | 310.8 | 283.4 | 34.6 | 29.0 | 503.7 | 446.1 |

TABLE 11-continued

Bulk Mini-Kramer Shear Analysis of Cranberries

| Replicates | Firmness (N) | | Distance to Peak Force (mm) | | Shear Work (N · sec) | |
|---|---|---|---|---|---|---|
| | UC | C | UC | C | UC | C |
| 4 | 262.9 | 256.9 | 32.0 | 30.8 | 420.0 | 430.3 |
| 5 | 359.8 | 282.8 | 33.1 | 29.6 | 533.4 | 423.6 |
| 6 | 297.0 | 223.5 | 32.0 | 31.0 | 464.4 | 375.7 |
| 7 | 289.9 | 195.3 | 33.6 | 30.9 | 457.5 | 303.2 |
| 8 | 353.6 | 286.7 | 34.3 | 33.8 | 517.6 | 440.7 |
| 9 | 353.4 | 254.8 | 31.8 | 29.8 | 583.0 | 386.5 |
| 10 | 359.7 | 207.8 | 36.7 | 30.4 | 611.7 | 353.7 |
| Average | 313.4 | 241.9 | 33.1 | 31.0 | 496.9 | 384.8 |
| Std Dev | 39.6 | 35.4 | 1.8 | 1.6 | 65.0 | 48.9 |
| CV | 12.6 | 14.6 | 5.6 | 5.1 | 13.1 | 12.7 |

(UC = uncoated, C = coated, Std Dev = Standard Deviation, CV = Coefficient of Variation)

TABLE 12

Bulk Mini-Kramer Shear Analysis of Peas

| Replicates | Firmness (N) | | Distance to Peak Force (mm) | | Shear Work (N · sec) | |
|---|---|---|---|---|---|---|
| | UC | C | UC | C | UC | C |
| 1 | 2246.9 | 1801.8 | 29.4 | 29.1 | 1691.0 | 1346.0 |
| 2 | 2580.0 | 2012.0 | 30.7 | 28.9 | 2042.2 | 1586.0 |
| 3 | 2393.7 | 2269.9 | 30.3 | 29.7 | 2031.2 | 1819.7 |
| 4 | 1998.0 | 2394.6 | 33.0 | 31.3 | 1911.1 | 2109.7 |
| 5 | 2116.8 | 1725.5 | 28.5 | 29.8 | 1700.3 | 1647.6 |
| 6 | 2337.9 | 2441.6 | 29.7 | 30.9 | 1830.9 | 2020.2 |
| 7 | 2180.6 | 2148.0 | 30.1 | 30.5 | 1907.7 | 1737.7 |
| 8 | 2323.8 | 2148.8 | 31.1 | 33.4 | 2173.9 | 1735.9 |
| 9 | 2346.1 | 2093.5 | 30.1 | 30.9 | 1834.0 | 1860.4 |
| 10 | 2278.4 | 2406.2 | 29.7 | 30.8 | 1955.2 | 1993.7 |
| Average | 2280.2 | 2144.2 | 30.2 | 30.5 | 1907.8 | 1785.7 |
| Std Dev | 159.8 | 246.8 | 1.2 | 1.3 | 151.9 | 227.8 |
| CV | 7.0 | 11.5 | 4.0 | 4.2 | 8.0 | 12.8 |

(UC = uncoated, C = coated, Std Dev = Standard Deviation, CV = Coefficient of Variation)

For green beans, sweet potatoes, apples and cranberries, the results for firmness, shear work, adhesive strength and adhesive work were all higher for the uncoated compared to the coated samples. The test results for these samples were consistent with the observation that the uncoated samples were more crunchy, inflexible and prone to crush under force, whereas the oil-coating increased the flexibility, pliability, and resilience of the inclusions and makes them more resistant to breakage.

It should be understood that the invention is not limited to the particular embodiments described herein, but that various changes and modifications may be made without departing from the spirit and scope of this novel concept as defined by the following claims. Further, many other advantages of applicant's invention will be apparent to those skilled in the art from the above descriptions and the below claims.

What is claimed is:

1. A pet food comprising:
   a plurality of kibbles each configured with a concave curve and a convex curve having an angle of curvature between 90 and 180 degrees; and
   one or more oil-coated inclusions distributed within the plurality of kibbles; wherein the density disparity between the kibbles and the inclusions is reduced by coating the inclusions with oil.

2. The pet food of claim 1, wherein the inclusions are selected from dehydrated products, freeze-dried products, and combinations thereof.

3. The pet food of claim 1, wherein said inclusions are selected from a fruit, a vegetable, a meat chunk, a supplement, and combinations thereof.

4. The pet food of claim 3, wherein said fruit is selected from apples, tomatoes, bananas, pears, strawberries, cranberries, blueberries, raspberries, and combinations thereof.

5. The pet food of claim 3, wherein said vegetable is selected from sweet potatoes, potatoes, legumes/beans, pumpkin, peas, zucchini, celery, broccoli, cabbage, carrots, cucumbers, green beans, and combinations thereof.

6. The pet food of claim 3, wherein said meat chunk is from a source selected from hogs, cattle, sheep, goats, deer, buffalo, kangaroo, alligator, snail, chicken, duck, goose, turkey, guinea hen, and combinations thereof.

7. The pet food of claim 1, wherein the kibbles are up to 4 times larger than the inclusions.

8. The pet food of claim 1, wherein each kibble has one or more configurations comprising at least one pocket formed by a curve of a predetermined radius at the edge of the kibble, and wherein the kibbles interlocks with each other when adjacently placed to another kibble to form a lattice-like barrier.

9. The pet food of claim 8, wherein the kibble configuration assists in the distribution of the inclusions within the pet food.

10. The pet food of claim 1, wherein the kibble shapes are selected from a crescent, a peanut, a star, an x, a flower, a gear, a shape that has more than 6 curves, and combinations thereof.

11. The pet food of claim 1, wherein the kibbles are manufactured by a process selected from injection molding, clamshell molding, extrusion, cold forming extrusion, rotary molding, and combinations thereof.

12. The pet food of claim 1, wherein the amount of oil increases the density of the inclusions up to 30% based on a comparison of the density of the inclusions before and after being coated with the oil.

13. The pet food of claim 1, wherein the amount of oil increases the density of the inclusions by at least 1 lb/cubic foot.

14. The pet food of claim 1, wherein the density of the kibbles is about 20-40 lb/cu ft.

15. The pet food of claim 1, wherein the kibbles have a density of 20-40 lb/cu ft, and wherein the inclusions have a density of about 4-8 lb/cu ft prior to being coated with oil and a density of about 6-8 lb/cu ft after being coated with oil.

16. The pet food of claim 1, wherein the pet food product comprises up to 50% by weight of oil-coated inclusions.

17. A pet food product, comprising:
   a plurality of kibbles each having a concave curve and a convex curve having an angle of curvature between 90 and 180 degrees, the concave and the convex curves of adjacent kibbles configured to interlock to form a lattice-like barrier; and
   one or more oil-coated inclusions,
   wherein the density disparity between the kibbles and the inclusions is reduced by coating the inclusions with oil and the kibbles and inclusions are distributed within a package and wherein the lattice-like barrier and reduced density disparity and reduces relative movement of the kibbles and the inclusions such that the distribution of the kibbles and the inclusions remains relatively constant when the package is moved.

18. The pet food product of claim 17, wherein the distribution of the kibbles and inclusions does not vary more than 20% from the time the package is filled to the time the package is opened by a consumer.

19. The pet food product of claim 17, wherein the variation between the distribution of the kibbles and inclusions at the time when the package is filled and the time when the package is opened by a consumer is at least 10% less than a package having kibbles and inclusions of similar density and size but not including the pockets on the kibbles.

* * * * *